Sept. 25, 1962
G. W. MILLER
3,055,225
AUXILIARY CONTROL LEVER
Filed Feb. 26, 1960
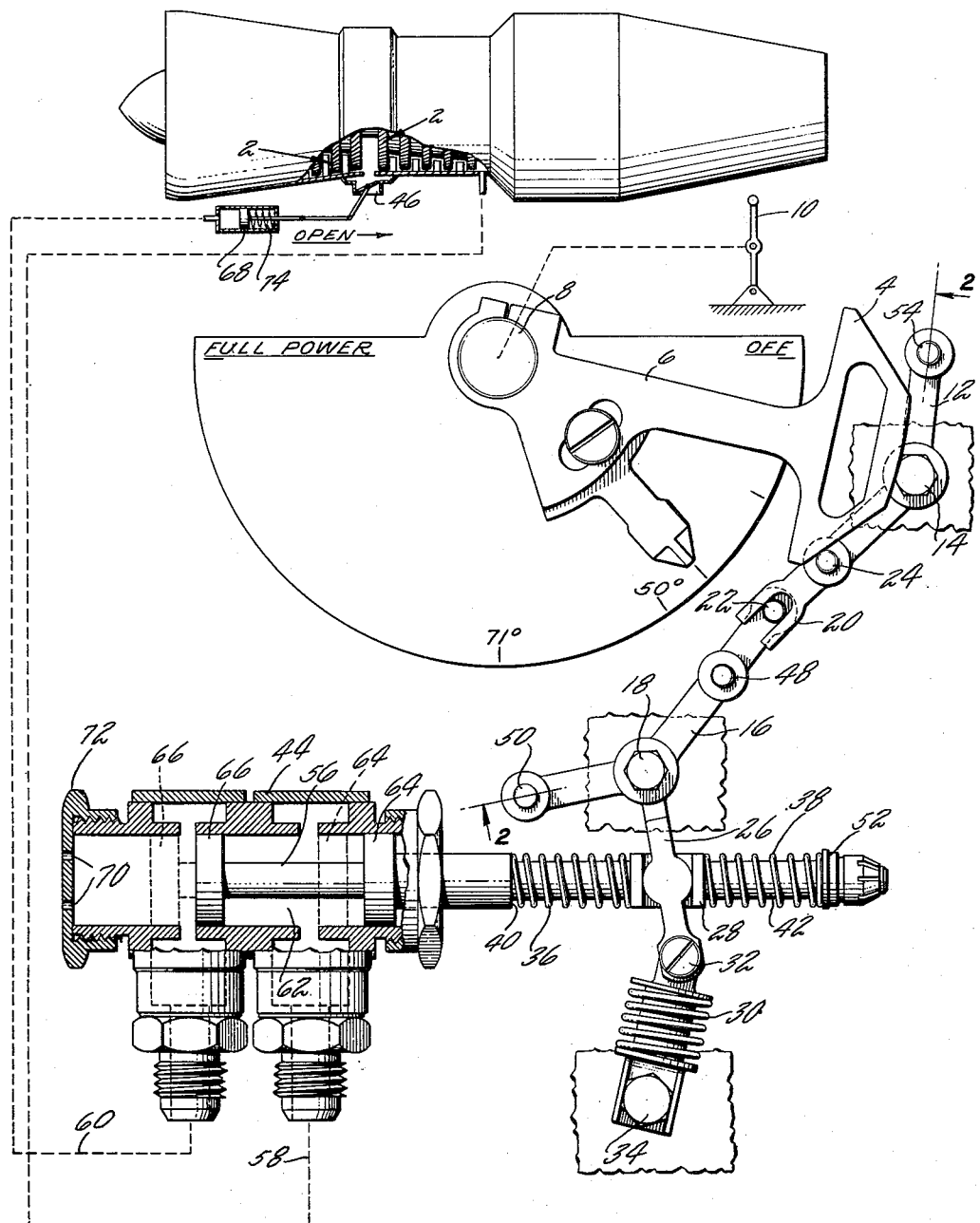
INVENTOR
GUY W. MILLER
BY Charles A. Warren
ATTORNEY

United States Patent Office 3,055,225
Patented Sept. 25, 1962

3,055,225
AUXILIARY CONTROL LEVER
Guy W. Miller, Vernon, Conn., assignor to United Aircraft Corporation, East Hartford, Conn., a corporation of Delaware
Filed Feb. 26, 1960, Ser. No. 11,349
9 Claims. (Cl. 74—96)

The present invention relates to an actuating mechanism.

In many situations, a reciprocating or oscillating cam operates to actuate certain machine elements at predetermined points in the cam travel. It is frequently desirable to have these machine elements actuated at different points on the return stroke of the cam. One feature of this invention is an arrangement by which to obtain one cycle of actuation during one stroke of the actuating cam, but a different cycle, or different timing of the cycle, on the return stroke.

One device to which the actuating mechanism is applicable is the bleed control for an axial flow compressor in which the valves are opened and closed at selected positions of the control lever during starting and operating of a gas turbine engine of which the compressor is an element, and the same valves are opened and closed at different positions of the control lever during a decrease in power by movement of the control lever toward the "power off" position. Accordingly, one particular feature of this invention is a linkage arrangement by which to accomplish the above results with a minimum of operating parts.

Other features and advantages will be apparent from the specification and claims, and from the accompanying drawing which illustrates an embodiment of the invention.

FIG. 1 is a showing of a turbojet engine, including an enlarged schematic representation of the compressor bleed and its actuating mechanism.

FIG. 2 is a sectional view along line 2—2 of FIG. 1.

The invention is shown in connection with the two-stage axial compressor 2 of a jet engine power plant and a compressor bleed valve 46. At certain low speeds the compressor tends to pass more air than it can handle, and compressor stall results. To avoid this situation, a valve is placed between low and high compressors of a twin-spool engine to bleed off excess air. The bleed valve is opened and closed at predetermined points during acceleration and deceleration of the engine. However, the operating characteristics of the engine require that the cycling of the bleed valve occur at different engine speeds for acceleration and deceleration. It therefore, is necessary to employ a mechanism to provide two different cycles for the bleed valve.

Arm 6 is pivoted on fixed pin 8 and coupled to power lever 10 to move directly through the power lever. This arm has an integral cam 4 which actuates a linkage consisting of bellcrank 12 which is pivoted on fixed pin 14 and bellcrank 16 which is pivoted on fixed pin 18. The bellcranks are connected by means of clevis 20 on bellcrank 12 and pin 22 on bellcrank 16. The cam is effective through only the initial part of the stroke of the power lever as will be apparent.

During movement of the power lever from the off position to full power, arm 6 is rotated in a clockwise direction, carrying cam 4 along its predetermined path into engagement with pin 24 which protrudes from bellcrank 12. Bellcrank 12 is rotated counterclockwise and through the interaction of clevis 20 and pin 22, bellcrank 16 is rotated clockwise. Arm 26 is a part of bellcrank 16 and is pivotally connected to compressible link 30 by pin 32. Compressible link 30 pivots about fixed pin 34. The clockwise rotation of bellcrank 16 results in a sliding action between arm 26 and sliding block 28 thereby causing movement of sliding block 28 in the direction to compress spring 36 and elongate spring 38. A toggle action occurs from compressible link 30 to insure the full movement of sliding block 28. Spring 36 acts on shoulder 40 of rod 42 and rod 42 moves attached shuttle valve 56 in valve housing 44 so that line 58 communicates with line 60 through chamber 62 between lands 64 and 66 to port compressor discharge air to actuating piston 68 of compressor bleed valve 46 to open the bleed valve. As rod 42 moves into the valve 44, springs 36 and 38 are returned to their normal length. It will be noted that the above described counterclockwise rotation of bellcrank 12 and simultaneous clockwise rotation of bellcrank 16 moves protruding pin 48 on bellcrank 16 out of the cam path and moves protruding pin 50 on bellcrank 16 into cam engaging position.

As the power lever is moved further in the direction of full power, cam 4 continues its clockwise rotation, passes over pin 48 on bellcrank 16 without engaging it, and engages pin 50 on bellcrank 16. This causes a counterclockwise rotation of bellcrank 16 which results in the withdrawal of rod 42 from valve housing 44 as sliding block 28 moves to elongate spring 36 and compress spring 38 on shoulder 52 of rod 42. Once again, springs 36 and 38 are returned to their normal length as the rod is withdrawn, and the toggle action of compressible link 30 insures full movement of sliding block 28. The withdrawal of rod 42 from valve housing 44 moves attached shuttle valve 56 to shut off the flow of compressor discharge air to piston 68 via line 58 and line 60. Piston 68 is now vented through line 60 and holes 70 in valve housing cap 72 so that spring 74 and air within the compressor will close the bleed valve.

After a certain engine speed has been attained, no further operation of the bleed valve is necessary. Therefore, cam 4 having engaged pin 50 after traveling through a portion of its predetermined path, shown as 71° for purposes of illustration, further rotation of arm 6 will not affect the bleed valve. That is, any movement of the power lever in the range from 71° to full power will still leave the bleed valve closed. As was pointed out above, the bleed valve is cycled for decreasing thrust at engine speeds different from the cycle speeds when increasing thrust. Therefore, movement of the power lever in the direction of decreasing thrust will not affect the bleed valve until the cam, returning along its original path, is in the position such that it forms an angle with its off position shown as 50° for purposes of illustration.

As cam 4 is rotated counterclockwise, it passes over pin 50 without engaging pin 50 since bellcrank 16 was previously rotated in a counterclockwise direction and was held in that position by the toggle action of compressible link 30. The cam engages pin 48 which protrudes from bellcrank 16, rotates bellcrank 16 in a clockwise direction and results in the opening of the bleed valve in the manner described above. At the same time, bellcrank 12 is rotated counterclockwise through the action of clevis 20 and pin 22 moving protruding pin 24 out of the path of cam 4, and putting protruding pin 54 into cam engaging position. On further counterclockwise movement of cam 4 it passes over pin 24 and engages pin 54. This results in a clockwise rotation of bellcrank 12, a counterclockwise rotation of bellcrank 16, and the closing of the bleed valve in the manner described above.

As can be seen from the above description, this invention uses a single actuating mechanism to achieve different operating cycles for a valve.

It is to be understood that the invention is not limited to the specific embodiment herein illustrated and described but may be used in other ways without departure from its spirit as defined by the following claims.

I claim:
1. In an actuating system, a cam movable in a predeter- mined path, a plurality of bellcrank levers pivotally mounted on spaced parallel axes in fixed relation to the cam path, means for interconnecting the levers at their adjacent ends for simultaneous and opposite rocking movement, an actuating arm on one of said levers, and cam engaging elements on each lever for successive engagement by movement of said cam in its predetermined path, said cam engaging elements being in spaced relation to each other along the cam path for successive engagement by the cam.

2. An actuating system as in claim 1 in which the cam engaging elements are spaced from the pivotal mountings for the levers along the cam path.

3. An actuating system as in claim 1 in which the levers are interconnected by a slidable connection.

4. An actuating system as in claim 1 in which the cam engaging elements are so positioned on the levers that certain of said cam engaging elements are moved into cam engaging position by the movement of said levers resulting from engagement between said cam and certain others of said cam engaging elements.

5. In an actuating system, a control lever, a pivotally mounted arm to which said lever is connected and which is caused to move through a predetermined oscillatory path by said control lever, a cam mounted on said arm, at least two bellcrank levers pivotally mounted in spaced relation to each other and interconnected for movement in unison, one of said levers having an actuating arm for connection to a unit to be operated, each of said levers having a plurality of cam engaging elements by which the levers are moved in a predetermined sequence by said cam, certain of said cam engaging elements being moved into operative cam engaging position by the movement of the cam in one direction of its movement.

6. An actuating system as in claim 5 in which cam engaging elements are spaced from the pivotal axes of the bellcrank levers.

7. An actuating system as in claim 5 in which said actuating arm is a part of a toggle linkage for holding said actuating arm selectively in either of two end positions.

8. In a mechanism for actuating a two-position sliding valve, the combination of a cam, a plurality of interconnected bellcrank levers mounted in fixed relation to the cam path, cam engaging elements on said bellcrank levers, an actuating arm on one of said levers adapted to be connected to the valve, and a toggle device engaging one of said levers to hold the levers in either of two positions.

9. In an actuating system, a cam movable alternately in opposite directions in a predetermined path, a plurality of bellcrank levers pivotally mounted in fixed relation to the cam path, means for interconnecting the levers for simultaneous movement, first cam engaging elements on each lever for engagement by said cam in its predetermined movement in one direction, and second cam engaging elements on said levers in spaced relation to the first cam engaging elements in the cam path for engagement by said cam in the predetermined movement of said cam in the opposite direction.

References Cited in the file of this patent

UNITED STATES PATENTS

| | | |
|---|---|---|
| 520,775 | Fowler et al. | June 5, 1894 |
| 731,629 | Stratton | June 23, 1903 |
| 1,758,226 | Kaufman | May 13, 1930 |
| 1,968,406 | Lambeck | July 31, 1934 |
| 2,140,667 | Corsepius | Dec. 20, 1938 |
| 2,311,465 | Parker | Feb. 16, 1943 |
| 2,513,950 | Mares | July 4, 1950 |
| 2,619,006 | Debrie | Nov. 25, 1952 |
| 2,630,333 | Petersen | Mar. 3, 1953 |
| 2,741,896 | Geiger | Apr. 17, 1956 |
| 2,866,954 | Johnson et al. | Dec. 30, 1958 |
| 2,989,229 | Barbeau | June 20, 1961 |

FOREIGN PATENTS

| | | |
|---|---|---|
| 1,182,296 | France | Jan. 19, 1959 |